(12) United States Patent
Pays et al.

(10) Patent No.: US 7,856,715 B2
(45) Date of Patent: Dec. 28, 2010

(54) METHOD FOR REMOVABLY SECURING AN INTERNAL WALL WITHIN A VESSEL

(75) Inventors: Christian Pays, Fontenay le Fleury (FR); Christophe Corailler, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 1043 days.

(21) Appl. No.: 10/597,033

(22) PCT Filed: Jan. 25, 2005

(86) PCT No.: PCT/EP2005/000787

§ 371 (c)(1),
(2), (4) Date: Jul. 7, 2006

(87) PCT Pub. No.: WO2005/070515

PCT Pub. Date: Aug. 4, 2005

(65) Prior Publication Data

US 2009/0014451 A1    Jan. 15, 2009

(30) Foreign Application Priority Data

Jan. 27, 2004 (EP) .................................. 04290202

(51) Int. Cl.
*B65D 53/00* (2006.01)
*B65D 25/04* (2006.01)
*B23P 11/00* (2006.01)

(52) U.S. Cl. .................. 29/888.3; 29/407.05; 29/426.1; 29/426.3; 29/455.1; 220/524; 220/526; 220/529; 210/521; 210/346; 277/626

(58) Field of Classification Search ................ 29/888.3, 29/896.62, 407.01, 407.05, 426.1, 426.3, 29/451, 454, 455.1; 220/524, 526, 529, 532, 220/523, 23.9, 495.03; 210/802, 521, 346, 210/398; 277/314, 626, 641, 646
See application file for complete search history.

(56) References Cited

U.S. PATENT DOCUMENTS

| | | | | |
|---|---|---|---|---|
| 3,313,020 A * | 4/1967 | Krauskopf | ................. | 29/455.1 |
| 5,073,261 A * | 12/1991 | Conradi et al. | ........... | 210/242.1 |
| 6,074,557 A | 6/2000 | Lyles | | |
| 6,827,851 B1 * | 12/2004 | Strohm et al. | ................ | 210/228 |
| 6,827,865 B1 * | 12/2004 | Fenwick | ..................... | 210/802 |

FOREIGN PATENT DOCUMENTS

CH    446211    10/1967
FR    2789059    8/2000

\* cited by examiner

*Primary Examiner*—Jermie E Cozart
(74) *Attorney, Agent, or Firm*—Matthias Abrell; Myron K. Stout

(57) ABSTRACT

A vessel system comprising a vessel. The vessel system further comprises at least one internal wall located within the vessel. The vessel system further comprises at least one inflatable seal allowing to create a seal between an outer periphery of the internal wall and an internal cavity wall of the vessel.

7 Claims, 3 Drawing Sheets

METHOD FOR REMOVABLY SECURING AN INTERNAL WALL WITHIN A VESSEL

BACKGROUND OF INVENTION

1. Field of the Invention

The invention relates generally to the field of vessels with internal walls.

2. Background Art

Vessels with one or more internal walls are commonly used in various industries, e.g. the petroleum industry, or the food industry. The internal wall may be used as a panel to divide an internal volume of a vessel into two or more separate volumes. The internal wall is positioned at an internal section of the vessel and an outer periphery of the internal wall is sealed against an internal cavity wall of the vessel.

If the internal wall is watertight, the internal wall allows to store a fluid in one of the separate volumes when sealed within the vessel.

The internal wall may comprise a filter allowing a passage of a fluid. For example, a fluid comprising an aqueous phase and a solid phase may flow inside the vessel through the filter: the solid phase may be retained at the filter of the internal wall and a purified fluid mainly composed of the aqueous phase may be recovered at an output of the vessel.

A filtering action may also be performed by the vessel system with an internal wall supporting a coalescing polymer. Such vessel system may be used for separating an oily phase from an aqueous phase. An emulsion fluid comprising small oil droplets within the aqueous phase may flow through the vessel. The oil droplets may adhere to the coalescing polymer at the internal wall and may coalesce to form large oil drops. The large oil drops are then entrained by the flowing of the emulsion fluid. The large oil drops may be isolated from the aqueous phase more easily than the small oil droplets. Such a filtering vessel is described in the international application WO 02/20115.

Whether the vessel system is intended to contain a liquid, or to filter a fluid flowing through the vessel, the internal wall needs to have its outer periphery sealed against an internal cavity wall of the vessel. Such sealing is usually performed using nuts and bolts.

FIG. 1 illustrates an example of a vessel with internal walls. A vessel system 107 comprises a vessel 101 inside of which are located a plurality of internal walls 102. A cap 105 at an end of the vessel 101 allows to provide an opening of the vessel 101. A fluid may flow through the vessel 101, from an input opening 114 of the vessel 101 to an output opening 115.

A seal between an outer peripheral of each internal wall 102 and an internal cavity wall of the vessel 101 may be achieved by providing bulkhead rims 106 along the internal cavity wall. Each internal wall 102 may be fixed against the corresponding bulkhead rim 106 using a plurality of nuts 104 and bolts 103.

The internal walls may need to be removed out of the vessel during a dismantling operation. For example, in a case in which the vessel system is intended to be used as a container for a fluid, the internal walls may be removed to allow washing the inside of the vessel system. The dismantling operation is also necessary for a vessel system that is used as a filtering system, as represented in FIG. 1. If a solid phase or a liquid phase is retained at filters, the internal walls supporting the filters may be regularly removed for cleaning. For an internal wall supporting a coalescing polymer, the coalesced oil drops are entrained away of the internal wall, but the internal wall also needs to be regularly cleaned with a liquidizer.

The removing of the internal wall requires a human intervention to dismantle the nuts and bolts. Similarly, once the dismantling operation is performed, a human operator installs the internal walls in the vessel.

SUMMARY OF INVENTION

In a first aspect, the invention provides a vessel system comprising a vessel. The vessel system further comprises at least one internal wall located within the vessel. The vessel system further comprises at least one inflatable seal allowing to create a seal between an outer periphery of the internal wall and an internal cavity wall of the vessel.

In a first preferred embodiment, the at least one inflatable seal is inserted within a peripheral groove of the internal wall. The at least one inflatable seal allows to secure the internal wall inside the vessel when the inflatable seal is inflated. The at least one inflatable seal allows to remove the internal wall from the vessel when the inflatable seal is deflated.

In a second preferred embodiment, the vessel system further comprises a shaft traversing longitudinally the vessel. The shaft allows to transmit a force applied on the at least one internal wall to an end of the vessel.

In a third preferred embodiment, the shaft is hollow. The vessel system further comprises a duct to supply an inflation medium to the at least one inflatable seal, the duct being located within the shaft.

In a fourth preferred embodiment, the vessel system further comprises a programmable logic controller to control a pressure of the inflation medium within the at least one inflatable seal.

In a fifth preferred embodiment, the vessel system further comprises a removable cap at an end of the vessel, the removable cap allowing when removed to open the vessel over a full section.

In a sixth preferred embodiment, the shaft comprises a plurality of individually detachable parts which are sequentially removable mounted. The vessel system further comprises a plurality of internal walls and a plurality of connectors. Each connector allows to connect two individually detachable parts at each inter-volume between two internal walls so as to allow to individually remove the internal walls from the vessel.

In a seventh preferred embodiment, a fluid is intended to flow through the vessel. The vessel system allows to separate a oily phase from an aqueous phase of the fluid. The at least one internal wall supports a coalescing polymer.

In an eighth preferred embodiment, the coalescing polymer allows oil droplets of the oily phase to coalesce to form large oil drops. The vessel system further comprises an oil output to allow to recover the large oil drops after the at least one internal wall.

In a second aspect, the invention provides an internal wall for use within a vessel. The internal wall comprises an inflatable seal. The inflatable seal allows to create a seal between an outer periphery of the internal wall and an internal cavity wall of the vessel.

In a third aspect, the invention provides a method for removably securing at least one internal wall within a vessel. The method comprises inflating at least one inflatable seal to create a seal between the at least one internal wall and an internal cavity wall of the vessel.

In a ninth preferred embodiment, the method further comprises monitoring a pressure of a medium fluid of the at least one inflatable seal. The pressure of the medium fluid is controlled.

In a tenth preferred embodiment, the method further comprises deflating the at least one inflatable seal. The vessel is opened over a full section. The at least one internal wall is removed from the vessel.

In an eleventh preferred embodiment, the coalescing polymer allows oil droplets of the oily phase to coalesce to form large oil drops. The large oil drops are recovered at an oil output after the at least one internal wall.

In a fourth aspect, the invention provides a method for dismantling a vessel system. The vessel system comprises a vessel and at least one internal wall located within the vessel. The method comprises deflating at least one inflatable seal. The at least one inflatable seal allows to create a seal between the at least one internal wall and an internal cavity wall of the vessel.

In a twelfth preferred embodiment, the method further comprises disposing the vessel in a vertical orientation. The vessel is opened over a full section by removing a removable cap at an end of the vessel. The at least one internal wall is removed from the vessel.

Other aspects and advantages of the invention will be apparent form the following description and the appended claims.

DETAILED DESCRIPTION

In the vessels systems from prior art, internal walls are sealed against an internal cavity of the vessel with nuts and bolts. Hence an operator is required to enter the vessel for removing and installing the internal walls. In a case of a vessel system for use with a relatively complex fluid, e.g. a petroleum in water emulsion, there is a risk that a gas escapes from the fluid. The gas may be noxious or inflammable. As a consequence, a maintenance operation with a dismantling of the vessel system may be relatively hazardous.

There is need for a vessel system comprising an internal wall that may be removed from its position with a minimized human intervention within the vessel.

Figure 1:
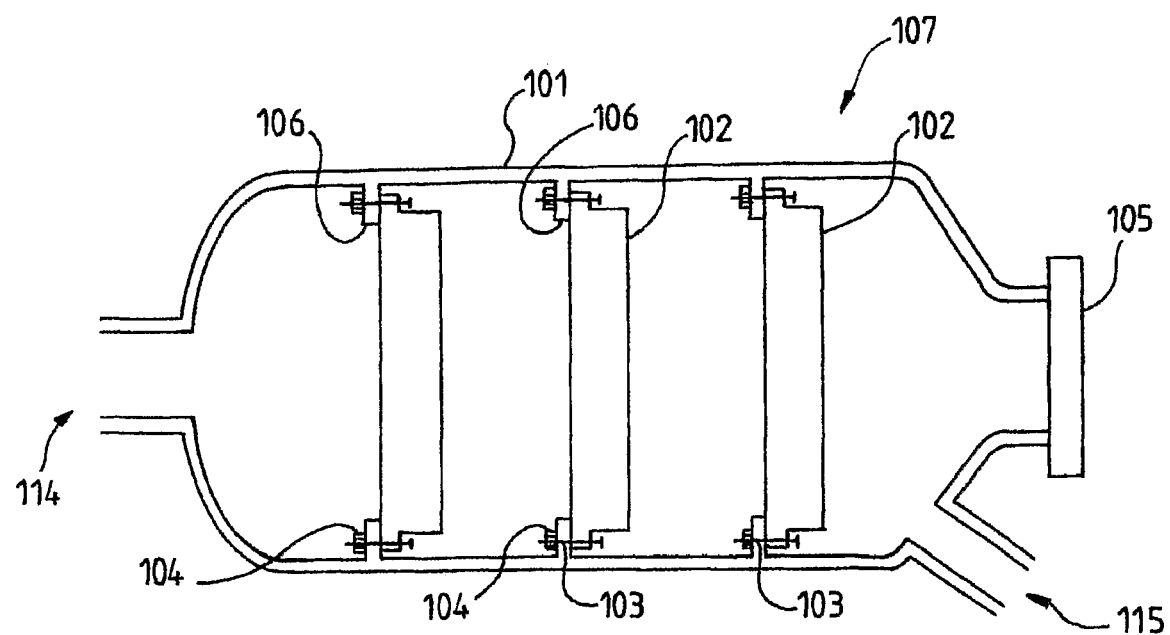
FIG. 1 shows an illustration of an example of a vessel system according to prior art.
Figure 2:
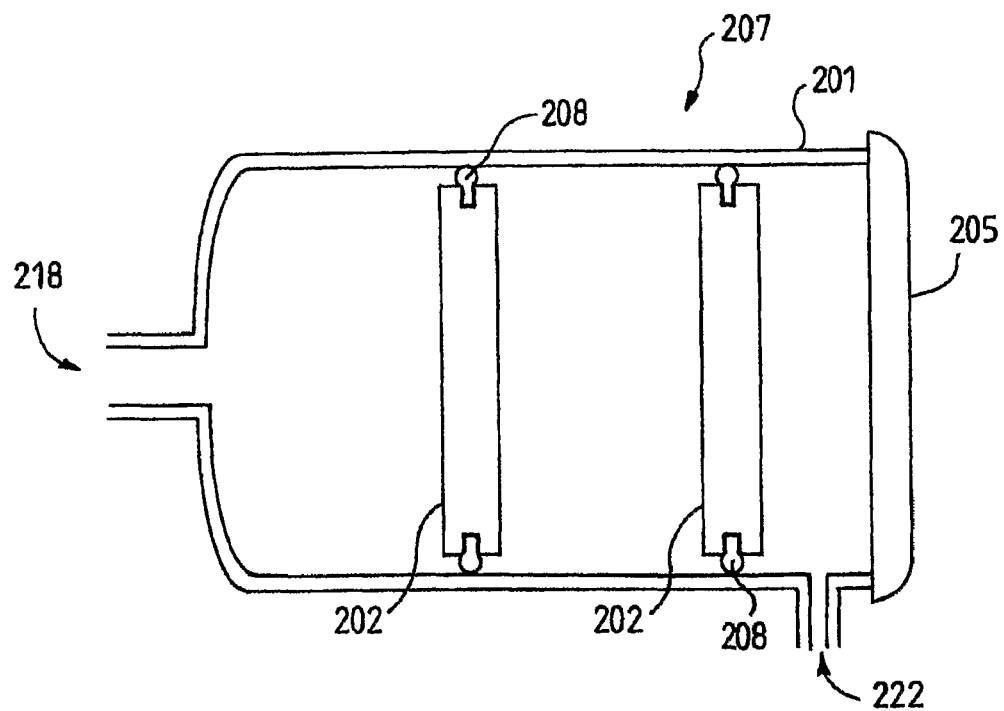
FIG. 2 shows an illustration of an example of a vessel system according to the present invention.

FIG. 2 illustrates an example of a vessel system according to the present invention. The vessel system 207 comprises a vessel 201, at least one internal wall 202 and at least one inflatable seal 208. Two internal walls 202 and the corresponding internal seals 208 are represented on the figure. The inflatable seals 208 allow to create a seal between an outer periphery of the internal wall 202 and an internal cavity wall of the vessel 201.

The inflatable seals 208 may be inflated and deflated using an inflation system (not represented). The inflating of the inflatable seals 208 provides a sealing, and the deflating of the inflatable seals 208 releases a grip of the seal on the internal cavity and allows sufficient clearance to remove the internal walls from the vessel. The vessel system 207 may comprise a removable cap 205 that allows when removed to open the vessel 201 over a full section.

The vessel system 207 according to the invention may comprise an input opening 218 and an output opening 222 to allow a flow of fluid through the vessel 201. The vessel system may also comprise a single opening, e.g. at the removable cap.

Figure 3A:
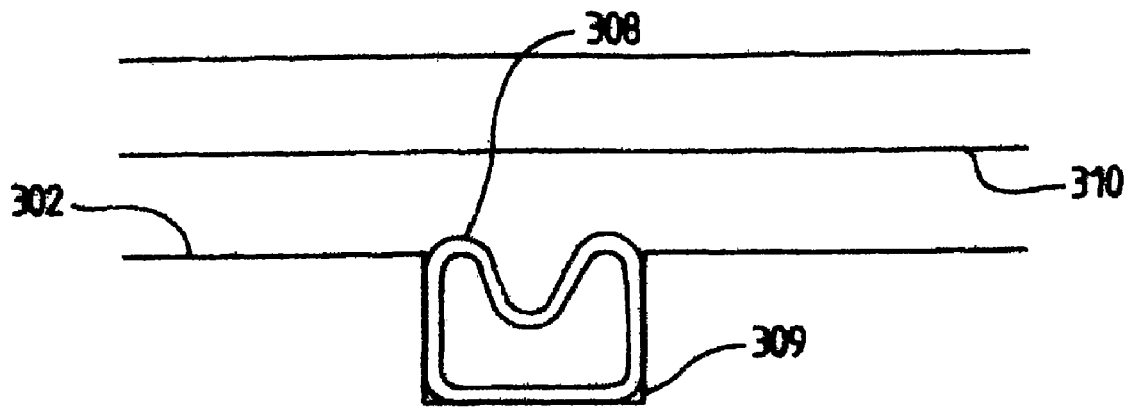
FIG. 3A and FIG. 3B illustrate an example of a sealing system according to the present invention.
Figure 3B:
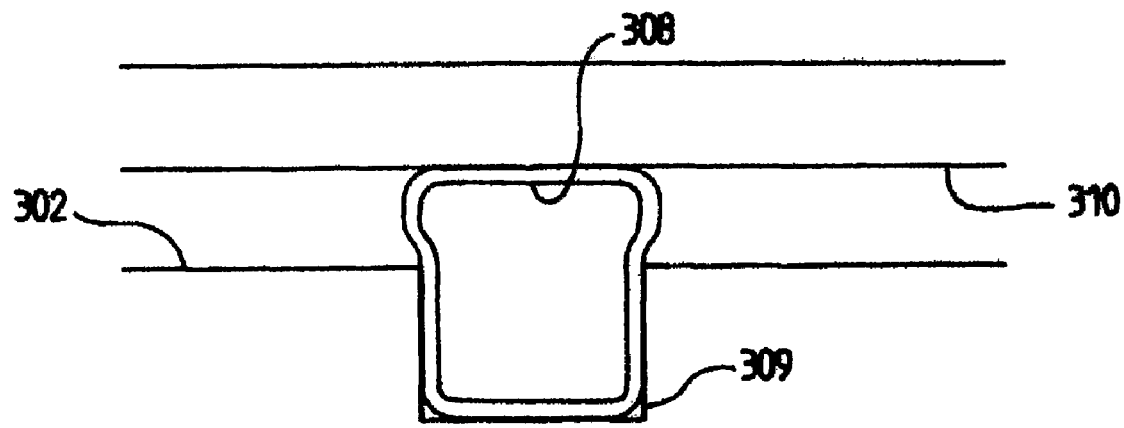

FIGS. 3A and 3B illustrate an example embodiment of a sealing system of a vessel system according to the invention, with a seal 308 that is respectively deflated (FIG. 3A) and inflated (FIG. 3B). The sealing system according to the example embodiment comprises a peripheral groove 309 located along an outer periphery of an internal wall 302. The seal 308 may be inserted within the peripheral groove 309: when deflated, as represented in FIG. 3A, the seal 308 remains at least partly located within the peripheral groove 309 without exerting any significant pressure on an internal cavity wall 310 of the vessel, thus allowing a movement of the internal wall 302 inside the vessel. When inflated, as represented in FIG. 3B, the seal 308 is blocked against the internal cavity wall 310 of the vessel, thus achieving a sealing action between the internal cavity wall 310 and the outer periphery of the internal wall 302.

Figure 4:
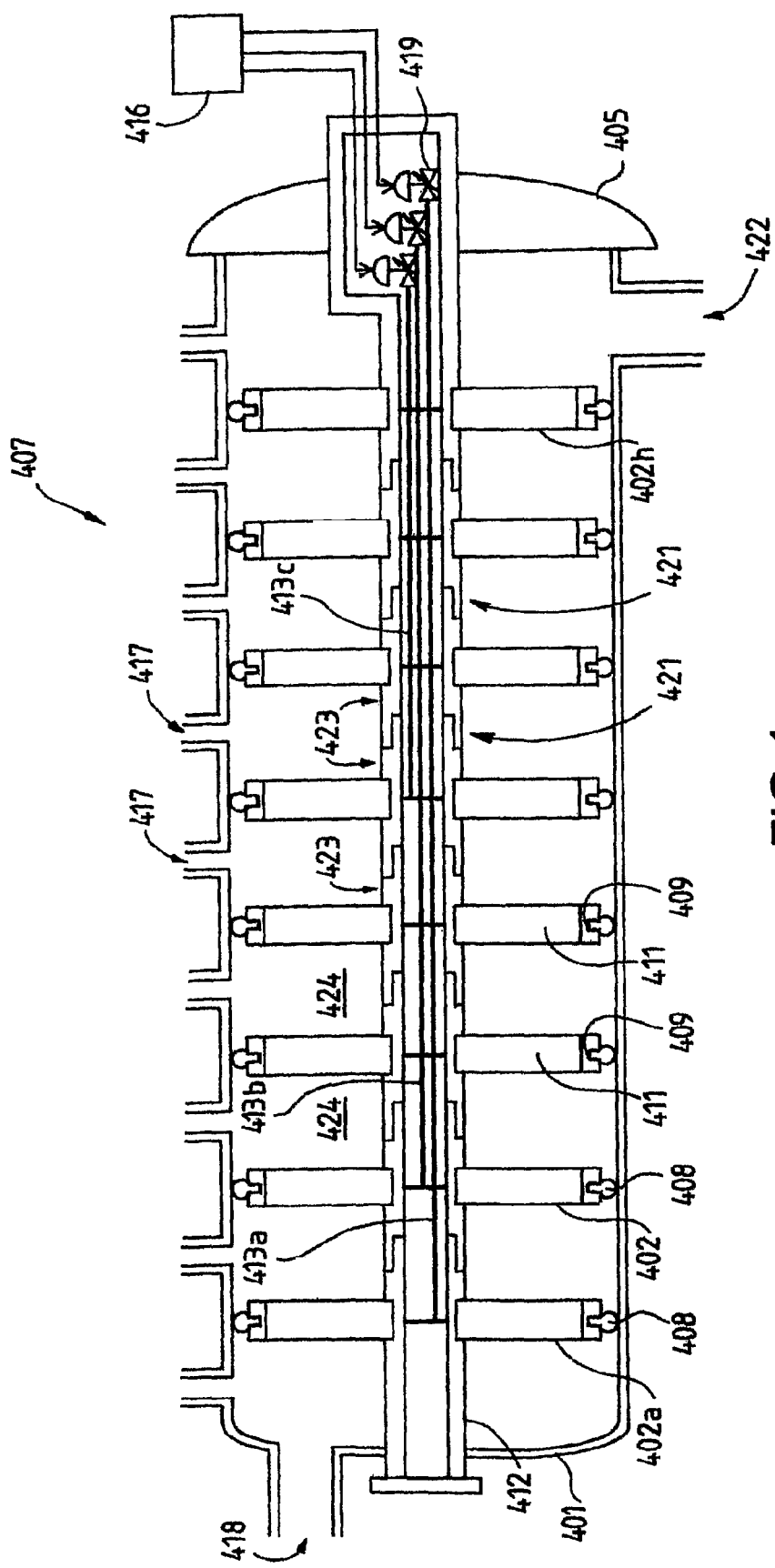
FIG. 4 shows an illustration of an example of a vessel system according to a preferred embodiment of the present invention.

FIG. 4 illustrates an example of a vessel system according to a preferred embodiment of the present invention. In the preferred embodiment, a vessel system 407 is used for a filtering purpose. A fluid is intended to flow through a vessel 401 from an input opening 418 to an output opening 422. The fluid may be an emulsion fluid comprising an aqueous phase and an oily phase. The oily phase may be formed of small oil droplets (not represented in FIG. 4), whereas the aqueous phase may be continuous.

For a better efficiency, the vessel system 407 comprises a plurality of internal walls 402, wherein several internal walls among the plurality of internal walls support a coalescing polymer 411. The oil droplets may adhere to the coalescing polymer 411 at the internal walls and may coalesce to form large oil drops (not represented in FIG. 4). The large oil drops are then entrained by the flowing of the emulsion fluid. The large oil drops may be isolated from the aqueous phase more easily than the small oil droplets: the large oil drop move to the surface of the fluid and may be recovered at oil outputs 417 after each internal wall 408.

The vessel system comprises a plurality of inflatable seals 408, each inflatable seal 408 allowing, when inflated, to create a seal between an outer periphery of the corresponding internal wall 402 and an internal cavity wall of the vessel 401. Each inflatable seal 408 may be inserted in a peripheral groove 409 of the corresponding internal wall 402. When deflated, the inflatable seals 408 allow to remove the internal walls 402 from the vessel 401.

Furthermore, the vessel system 407 may also comprise a shaft 412 traversing longitudinally the vessel 401. When the emulsion fluid flows through the vessel 401, the flowing generates a force on each internal wall 402. The shaft 412 may allow to transmit the force applied to each internal wall 402 to an end of the vessel 401 so as to avoid a moving of the sealed interval walls 402 relative to the vessel 401.

The inflatable seals 408 may be deflated during a dismantling operation, and may be inflated when installed within the vessel 401. The vessel system 407 may comprise a duct (413a, 413b or 413c) to supply an inflation medium from a reservoir (not represented) to the inflatable seals 408. The inflation medium may be a liquid (hydraulic inflation) or a gas (pneumatic inflation). The shaft 412 may be hollow and the duct (413a, 413b or 413c) may pass through the shaft 412.

In the preferred embodiment illustrated in FIG. 4, the vessel system 407 comprises eight internal walls 402 so as to insure an efficient separating of the oily phase from the aqueous phase. When the emulsion fluid flows through the vessel 401, a loss of charge along the vessel 401 is generated. A pressure inside the vessel 401 hence varies depending on a longitudinal position. Three ducts (413a, 413b, 413c) are provided for the eight inflatable seals 408, in order to avoid a single seal pressure for the eight inflatable seals 408. A first duct 413a may preferably insure a sealing of a first internal wall 402a that is first met by the emulsion fluid when flowing from the input opening 418. A second duct 413b and a third duct 413c may insure the inflating of the other inflatable seals.

For a determined internal wall, the seal pressure may indeed be relatively low as compared to an upper pressure and to a lower pressure, so as to avoid the inflatable seal to explode. The upper pressure may be defined as the pressure within the vessel 401 at an upper neighborhood of the determined internal wall corresponding to the inflatable seal, wherein the emulsion fluid flows from the upper neighborhood to the lower neighborhood. Similarly, the lower pressure may be defined as the pressure within the vessel at a lower neighborhood of the determined internal wall. The upper pressure is thus higher than the lower pressure because of the loss of charge within the determined internal wall. A seal pressure that is too high compared to the upper pressure and the lower pressure may cause the inflatable seal to explode.

However, if the seal pressure is very low, the inflatable seal may be entrained because of a difference between the upper pressure and the lower pressure. In order to insure a correct sealing, the seal pressure has to remain within a determined range while taking into consideration the upper pressure and the lower pressure.

The seal pressure of the inflatable seals 408 may be controlled either manually, or with a feedback circuit. Pressure sensors (not represented in FIG. 4) may monitor the seal pressure, the upper pressure and the lower pressure for each inflatable seal 408. A Programmable Logic Controller 416 (PLC) may calculate an adequate sealing pressure for each seal or group of seals, as three ducts insure the inflating of eight inflatable seals. The PLC 416 may control three air pressure regulators 419 corresponding to the three ducts (413a, 413b, 413c). The PLC 416 may communicate with a Man-Machine interface, such as a digital computer, (not represented on FIG. 4) to allow an operator to enter desired parameters, e.g. a desired pressure difference between the input opening 418 to the output opening 422 of the vessel 401.

When deflated, the inflatable seals 408 allow to remove the internal walls 402 without any operator entering into the vessel 401. The vessel 401 may be opened over a full section by dismantling a removable cap 405. The internal walls 402 and the shaft 412 may be moved along the vessel 401.

The shaft 412 may comprise a plurality of individually detachable parts 423 which are sequentially removably mounted. The individually detachable parts 423 may be connected with connectors 421. The individually detachable parts 423 may be attached to the internal walls (402, 402a) so as to transmit a force applied on the internal walls (402, 402a) to an end of the vessel 401. As represented in FIG. 4, one connector 421 may be provided for each inter-volume 424 between two internal walls: removing a single individually detachable part 423 allows to remove a single internal wall 402. The connectors 421 may hence allow to individually remove the internal walls 402 from the vessel 401.

During the dismantling operation, the vessel 401 may be disposed in a vertical orientation. The shaft 412 and the internal walls 402 may be hoisted down together until an eighth internal wall 402h is entirely below the opened full section. The eighth internal wall 402h is individually removed. The hoisting of remaining internal walls and the removing of each internal wall is repeated.

With a horizontally disposed vessel, a friction between the internal walls 402 and the internal cavity wall of the vessel 401 due to the weight of the internal walls 402 may appear when displacing the internal walls 402. The vessel is hence preferably disposed in the vertical orientation during the maintenance operations, so as to reduce the friction between the internal walls 402 and the internal cavity wall of the vessel 401.

The internal walls 402 may be installed within the vessel 401 following a similar procedure: the vessel 401 is disposed in the vertical orientation; each internal wall 402 is individually installed at the opened full section of the vessel 401 and is connected to already installed internal walls at the connector 421. The shaft 412 and the internal walls 402 are hoisted up so as to allow an installing of a further internal wall.

Preferably the internal walls of the vessel system allow oil droplets to coalesce into large drops so as to achieve a separating from a continuous aqueous phase.

Alternatively, the internal wall within the vessel allows a separating of any liquid from an immiscible carrying phase, e.g. gas, or an immiscible liquid. The separating may be performed via a coalescing step.

Alternatively, the vessel system may also be used to separate solid particles from a fluid.

Alternatively, the vessel system may also be used to separate miscible components of a mixture, e.g. cyclohexane and benzene. The vessel system may for example be a distillation column; the internal walls may be distributors, packing, trays etc. that are fixed within the column. The internal walls allow a condensing of a determined component from a gas phase to a liquid phase. The distillation column is particularly well adapted for purifying a fluid.

The one or more internal walls of the vessel system may also be used for a storage purpose or for any other purpose.

While the invention has been described with respect to a limited number of embodiment, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for removably securing at least one internal wall within a vessel, the method comprising the steps of:
   inflating at least one inflatable seal to create a seal between the at least one internal wall and an internal cavity wall of the vessel;
   attaching the at least one internal wall to a shaft, the shaft traversing longitudinally the vessel and adapted to transmit a force applied on the at least one internal wall to an end of the vessel;
   removably securing the at least one internal wall within the vessel; and
   attaching a removable cap at the end of the vessel.

2. The method of claim 1, further comprising the steps of:
   monitoring a pressure of a medium fluid of the at least one inflatable seal; and
   controlling the pressure of the medium fluid.

3. The method of claim 1, further comprising the steps of:
deflating the at least one inflatable seal;
opening the vessel over a full section of the vessel; and
removing the at least one internal wall from the vessel by hoisting the shaft.

4. The method of claim 1 wherein:
a fluid is intended to flow through the vessel;
the vessel being adapted to separate a oily phase from an aqueous phase of the fluid; and
the at least one internal wall supports a coalescing polymer.

5. The method of claim 4, wherein the coalescing polymer allows oil droplets of the oily phase to coalesce to form large oil drops, the method further comprising:
recovering the large oil drops at an oil output after the at least one internal wall relative to a direction of fluid flow.

6. A method for dismantling a vessel system, wherein the vessel system comprises a vessel and at least one internal wall located within the vessel, the method comprising the steps of:
deflating at least one inflatable seal, the at least one inflatable seal allowing to create a seal between the at least one internal wall and an internal cavity wall of the vessel;
attaching the at least one internal wall to a shaft, the shaft traversing longitudinally the vessel and adapted to transmit a force applied on the at least one internal wall to an end of the vessel; and
removing a removable cap at the end of the vessel.

7. The method of claim 6, further comprising the steps of:
disposing the vessel in a vertical orientation;
opening the vessel over a full section by removing the removable cap at the end of the vessel; and
removing the at least one internal wall from the vessel by hoisting the shaft.

* * * * *